(12) United States Patent
Yamamoto et al.

(10) Patent No.: US 11,131,839 B2
(45) Date of Patent: *Sep. 28, 2021

(54) SAMPLE OBSERVATION DEVICE AND SAMPLE OBSERVATION METHOD

(71) Applicant: HAMAMATSU PHOTONICS K.K., Hamamatsu (JP)

(72) Inventors: Satoshi Yamamoto, Hamamatsu (JP); Masanori Matsubara, Hamamatsu (JP); Norikazu Sugiyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,995

(22) Filed: Aug. 31, 2020

(65) Prior Publication Data

US 2020/0393661 A1 Dec. 17, 2020

Related U.S. Application Data

(63) Continuation of application No. 16/340,797, filed as application No. PCT/JP2017/029367 on Aug. 15, 2017, now Pat. No. 10,809,509.

(30) Foreign Application Priority Data

Oct. 11, 2016 (JP) ................. 2016-200075

(51) Int. Cl.
*G02B 21/00* (2006.01)
*G02B 21/36* (2006.01)
*G02B 21/16* (2006.01)

(52) U.S. Cl.
CPC ....... *G02B 21/0032* (2013.01); *G02B 21/008* (2013.01); *G02B 21/0036* (2013.01); *G02B 21/367* (2013.01); *G02B 21/16* (2013.01)

(58) Field of Classification Search
CPC ............ G02B 21/0032; G02B 21/008; G02B 21/367; G02B 21/0036; G02B 21/16
See application file for complete search history.

(56) References Cited

U.S. PATENT DOCUMENTS 9,116,353 B2     8/2015   Sangu
2004/0217270 A1  11/2004  Publicover et al.
(Continued)

FOREIGN PATENT DOCUMENTS

CN     105283791 A      1/2016
DE     102013107297 A1  1/2015
(Continued)

OTHER PUBLICATIONS

Dunsby et al., "Optically sectioned imaging by oblique plane microscopy," Optics Express, vol. 16, No. 25 Dec. 8, 2008, pp. 20306-20664, 2008.

(Continued)

*Primary Examiner* — Fernando Alcon
(74) *Attorney, Agent, or Firm* — Faegre Drinker Biddle & Reath LLP

(57) ABSTRACT

A sample observation device (1) includes: an emission optical system (3) for emitting planar light (L2) onto a sample (S); a scanning unit (4) for scanning the sample (S) with respect to an emission face (R) of the planar light (L2); an imaging optical system (5) having an observation axis (P2) inclined with respect to the emission face (R) and for forming an image from observation light (L3) generated in the sample (S) in accordance with the emission of the planar light (L2); an image acquiring unit (6) for acquiring a plurality of partial image data corresponding to a part of an optical image according to the observation light (L3) formed as an image by the imaging optical system (5); and an image generating unit (8) for generating observation image data of (Continued)

the sample S based on the plurality of partial image data generated by the image acquiring unit (6).

17 Claims, 12 Drawing Sheets

(56) References Cited

U.S. PATENT DOCUMENTS

| | | |
|---|---|---|
| 2006/0033987 A1 | 2/2006 | Stelzer et al. |
| 2007/0269085 A1 | 11/2007 | Oshiro et al. |
| 2010/0067103 A1 | 3/2010 | Sangu |
| 2011/0002530 A1 | 1/2011 | Zhuang et al. |
| 2011/0115895 A1 | 5/2011 | Huisken |
| 2011/0115897 A1 | 5/2011 | Najmabadi et al. |
| 2011/0304723 A1 | 12/2011 | Betzig |
| 2015/0177506 A1 | 6/2015 | Nishiwaki |
| 2015/0253560 A1 | 9/2015 | Otte et al. |

FOREIGN PATENT DOCUMENTS

| | | |
|---|---|---|
| DE | 102014102215 A1 | 8/2015 |
| JP | S62-180241 A | 8/1987 |
| JP | H03-172815 A | 7/1991 |
| JP | H11-211439 A | 8/1999 |
| JP | 2001-027728 A | 1/2001 |
| JP | 2005-265486 A | 9/2005 |
| JP | 2006-276377 A | 10/2006 |
| JP | 2010-54391 A | 3/2010 |
| JP | 2010-72014 A | 4/2010 |
| JP | 2013-156286 A | 8/2013 |
| JP | 2014-521122 A | 8/2014 |
| JP | 2014-202967 A | 10/2014 |
| JP | 2014-530387 A | 11/2014 |
| JP | 2015-135463 A | 7/2015 |
| WO | WO-2010/012980 A1 | 2/2010 |
| WO | WO-2013-010151 A1 | 1/2013 |
| WO | WO-2013/053454 A1 | 4/2013 |
| WO | WO-2014/063764 A1 | 5/2014 |
| WO | WO-2016/102200 A1 | 6/2016 |

OTHER PUBLICATIONS

Extended European Search Report dated Apr. 28, 2020 in European Patent Application No. 17859579.9.
International Preliminary Report on Patentability dated Apr. 25, 2019 for PCT/JP2017/029367.

(A)

(B)

(A)

(B)

SAMPLE OBSERVATION DEVICE AND SAMPLE OBSERVATION METHOD

CROSS-REFERENCE TO RELATED APPLICATIONS

This application is a continuation application of U.S. patent application Ser. No. 16/340,797, filed Apr. 10, 2019, which is a 371 of International Application No. PCT/JP2017/029367, filed Aug. 15, 2017, which claims the benefit of Japanese Patent Application No. 2016-2000075, filed Oct. 1, 2016, the contents of each of which is incorporated herein by reference.

TECHNICAL FIELD

The present disclosure relates to a sample observation device and a sample observation method.

BACKGROUND ART

As a method for observing the inside of a sample having a three-dimensional stereoscopic structure such as a cell, selective plane illumination microscopy (SPIM) is known. For example, a tomographic image observation device described in Patent Document 1 discloses the basic principle of SPIM of emitting planar light to a sample, forming an image of fluorescent light or scattered light generated inside the sample on an imaging surface, and acquiring image data observed from inside the sample.

As another sample observation device using planar light, for example, there is an SPIM microscope described in Patent Document 2. In this conventional SPIM endoscope, planar light is emitted while maintaining a constant inclination angle with respect to an arrangement face of a sample, and observation light from the sample is captured by an observation optical system having an observation axis orthogonal to an emission face of the planar light.

CITATION LIST

Patent Literature

Patent Literature 1: Japanese Unexamined Patent Publication No. S62-180241
Patent Literature 2: Japanese Unexamined Patent Publication No. 2014-202967

SUMMARY OF INVENTION

Technical Problem

In the sample observation device described in Patent Document 2 described above, by emitting planar light onto the whole surface of a focused face of an observation optical system, an image of a fault plane in an observation axial direction can be acquired by performing imaging once. Accordingly, in order to acquire three-dimensional information of a sample, it is necessary to scan the sample in the observation axial direction and acquire images of a plurality of fault planes in the observation axial direction. In such a conventional sample observation device, it is necessary to repeat selection of a fault plane from which an image is acquired (scanning a sample and stopping) and image acquisition until the images of all the fault planes are acquired. In addition, in a case in which an area occupied by an observation target is larger than an imaging area, in addition to the operation of acquiring a cross-sectional image in the observation axial direction, operations of moving a stage in a direction different from the observation axial direction and selecting an imaging field of view and the like are necessary. For this reason, there is a problem in that it takes time until observation image data is acquired.

An object of an embodiment is to provide a sample observation device and a sample observation method.

Solution to Problem

According to one aspect of an embodiment, there is provided a sample observation device including: an emission optical system for emitting planar light onto a sample; a scanning unit for scanning the sample with respect to an emission face of the planar light; an imaging optical system having an observation axis inclined with respect to the emission face and for forming an image from observation light generated in the sample in accordance with the emission of the planar light; an image acquiring unit for acquiring a plurality of partial image data corresponding to a part of an optical image according to the observation light formed as an image by the imaging optical system; and an image generating unit for generating observation image data of the sample based on the plurality of partial image data generated by the image acquiring unit.

In this sample observation device, a sample is scanned by the emission face of the planar light, and the observation axis of the imaging optical system is inclined with respect to the emission face of the planar light. For this reason, the image acquiring unit can sequentially acquire partial image data of fault planes in the direction of the optical axis of the planar light, and the image generating unit can generate observation image data of the sample based on the plurality of partial image data. In this sample observation device, an operation of selecting a field of view is not necessary, and a scanning operation for a sample and image acquisition can be simultaneously performed, whereby the throughput until the acquisition of the observation image data is improved.

In addition, the sample may be held by a sample container having an input face of the planar light, and an optical axis of the planar light according to the emission optical system may be disposed to be orthogonal to the input face of the sample container. In such a case, a plurality of samples can be scanned together using the sample container. In addition, by configuring the optical axis of the planar light to be orthogonal to the input face of the sample container, position correction for the partial image data acquired by the image acquiring unit and the like are not necessary, and the process of generating observation image data can be easily performed.

In addition, the scanning unit may scan the sample in a direction orthogonal to the optical axis of the planar light according to the emission optical system. In such a case, image processing such as position correction for the partial image data acquired by the image acquiring unit and the like is not necessary, and the process of generating observation image data can be easily performed.

In addition, an inclination angle of the observation axis of the imaging optical system with respect to the emission face of the planar light may be in the range of 10° to 80°. In this range, the resolution of an observed image can be sufficiently secured.

Furthermore, an inclination angle of the observation axis of the imaging optical system with respect to the emission face of the planar light may be in the range of 20° to 70°. In this range, the resolution of an observed image can be more sufficiently secured. In addition, a change in the field of view with respect to the amount of change in the angle of the observation axis can be suppressed, and the stability of the field of view can be secured.

In addition, an inclination angle of the observation axis of the imaging optical system with respect to the emission face of the planar light may be in the range of 30° to 65°. In this range, the resolution of an observed image and the stability of the field of view can be more appropriately secured.

In addition, the image acquiring unit may be configured to include a two-dimensional imaging device and for extracting image data corresponding to a part of the optical image of the observation light from data output from the two-dimensional imaging device as the partial image data. According to such a configuration, the partial image data can be acquired with high accuracy.

In addition, the image acquiring unit may include a line sensor for capturing a part of the optical image according to the observation light and outputting the partial image data. According to such a configuration, the partial image data can be acquired with high accuracy.

In addition, the image acquiring unit may include a slit transmitting a part of an optical image according to the observation light and an optical detector for detecting an optical image transmitted through the slit and is configured to generate the partial image data based on data output from the optical detector. According to such a configuration, the partial image data can be acquired with high accuracy.

In addition, the image generating unit may be configured to generate observation image data of the sample on a face orthogonal to the optical axis of the planar light based on the plurality of partial image data. In such a case, a cross-sectional image of the sample in which the influence of background is suppressed can be acquired as an observed image.

In addition, the sample observation device may further include an analysis unit for analyzing the observation image data and generating an analysis result. Since the observation image data generated by the image generating unit is analyzed by the analysis unit, the throughput of the analysis can be improved as well.

In addition, according to one aspect of an embodiment, there is provided a sample observation method including: an emission step of emitting planar light onto a sample; a scanning step of scanning the sample with respect to an emission face of the planar light; an imaging step of forming an image from observation light generated in the sample in accordance with the emission of the planar light using an imaging optical system having an observation axis inclined with respect to the emission face; an image acquiring step of acquiring a plurality of partial image data corresponding to a part of an optical image according to the observation light formed as an image by the imaging optical system; and an image generating step of generating observation image data of the sample based on the plurality of partial image data.

In this sample observation method, a sample is scanned by the emission face of the planar light, and the imaging optical system of which the observation axis is inclined with respect to the emission face of the planar light is used. For this reason, in the image acquiring step, partial image data of fault planes in the direction of the optical axis of the planar light can be sequentially acquired, and in the image generating step, observation image data of the sample can be generated based on a plurality of partial image data. In this sample observation method, an operation of selecting a field of view is not necessary, and a scanning operation for a sample and image acquisition can be simultaneously performed, whereby the throughput until the acquisition of the observation image data is improved.

Advantageous Effects of Invention

According to a sample observation device and a sample observation method, throughput until acquisition of observation image data is improved.

DESCRIPTION OF EMBODIMENT

Hereinafter, a sample observation device and a sample observation method according to a preferred embodiment will be described in detail with reference to the drawings.

[Configuration of Sample Observation Device]

Figure 1:
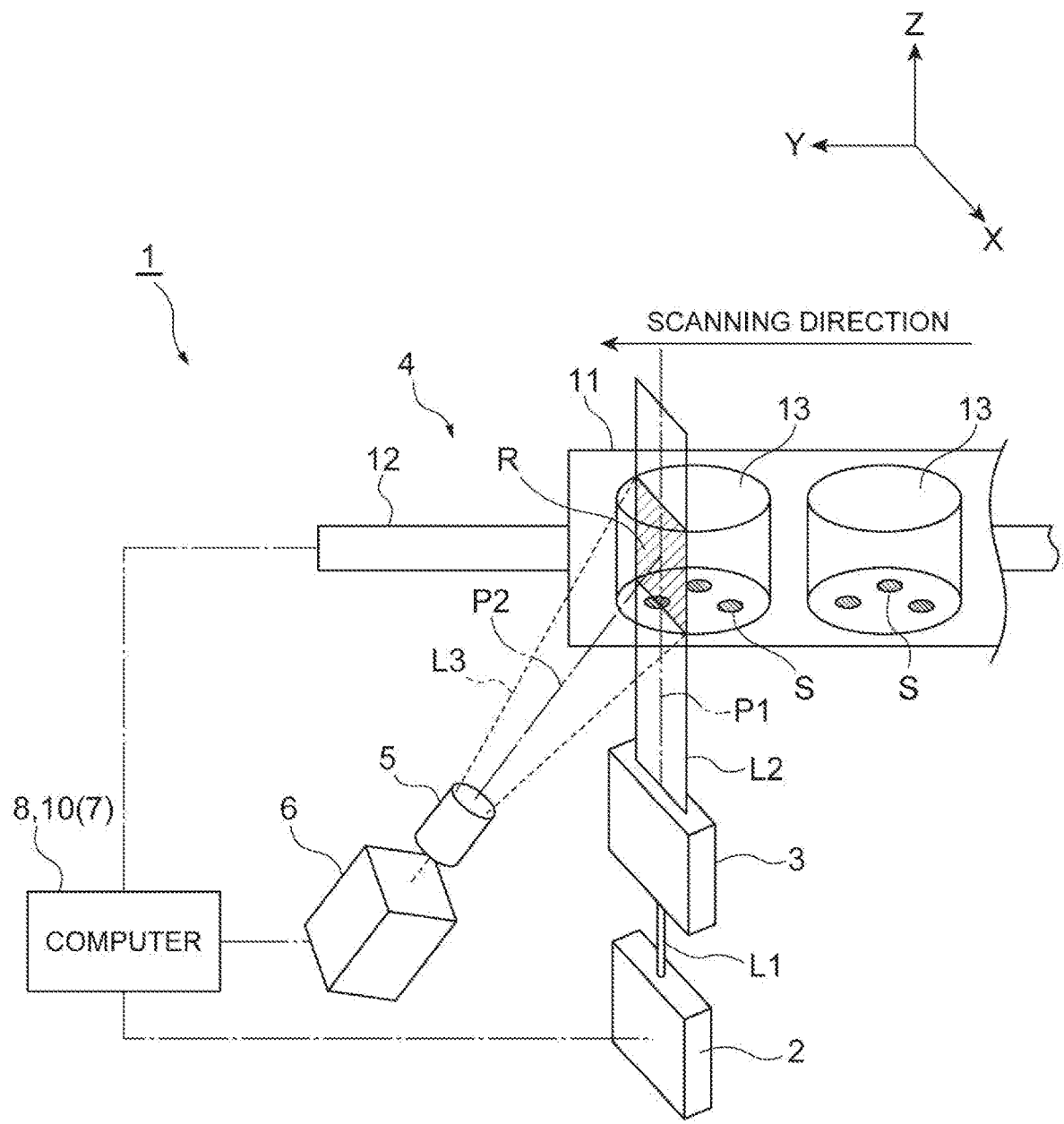
FIG. 1 is a schematic configuration diagram illustrating a sample observation device according to one embodiment.

FIG. 1 is a schematic configuration diagram illustrating a sample observation device according to one embodiment. This sample observation device 1 is a device that emits planar light L2 onto a sample S and acquires observation image data of the inside of the sample S by forming an image using at least one of fluorescent light, scattered light, and diffuse reflected light generated inside the sample S on an imaging surface. As a sample observation device 1 of such a type, there is a slide scanner that acquires and displays an image of a sample S maintained in a slide glass, a plate reader that acquires image data of a sample S maintained on a microplate and analyzes the image data, or the like. The sample observation device 1, as illustrated in FIG. 1, is configured to include a light source 2, an emission optical system 3, a scanning unit 4, an imaging optical system 5, an image acquiring unit 6, and a computer 7.

As a sample S that is an observation target, for example, there is a cell, a tissue, or an organ of a human or an animal, an animal or a plant, a cell or a tissue of a plant, or the like. In addition, the sample S may be contained in a solution, a gel, or a substance of which a refractive index is different from that of the sample S.

The light source 2 is a light source that outputs light L1 to be emitted to the sample S. As the light source 2, for example, there is a laser light source such as a laser diode or a solid laser light source. In addition, the light source 2 may be a light emitting diode, a super luminescent diode, or a lamp-system light source. The light L1 output from the light source 2 is guided to the emission optical system 3.

The emission optical system 3 is an optical system that shapes the light L1 output from the light source 2 into planar light L2 and emits the shaped planar light L2 onto the sample S along an optical axis P1. In the following description, the optical axis P1 of the emission optical system 3 may be referred to as an optical axis of the planar light L2. The emission optical system 3, for example, is configured to include a light shaping device such as a cylindrical lens, an axicon lens, or a spatial light modulator and is optically coupled with the light source 2. The emission optical system 3 may be configured to include an objective lens. The planar light L2 formed by the emission optical system 3 is emitted to the sample S. In the sample S to which the planar light L2 is emitted, observation light L3 is generated on an emission face R of the planar light L2. The observation light L3, for example, is at least one of fluorescent light excited by the planar light L2, scattered light of the planar light L2, and diffuse reflected light of the planar light L2.

In a case in which observation is performed in a thickness direction of the sample S, it is preferable that the planar light L2 be thin planar light of which a thickness is 2 mm or less in consideration of the resolution. In addition, in a case in which the thickness of the sample S is very small, in other words, in a case in which a sample S having a thickness that is equal to or less than Z-direction resolution is observed, there is no influence of the thickness of the planar light L2 on the resolution. Accordingly, planar light L2 of which a thickness exceeds 2 mm may be used.

Figure 2:
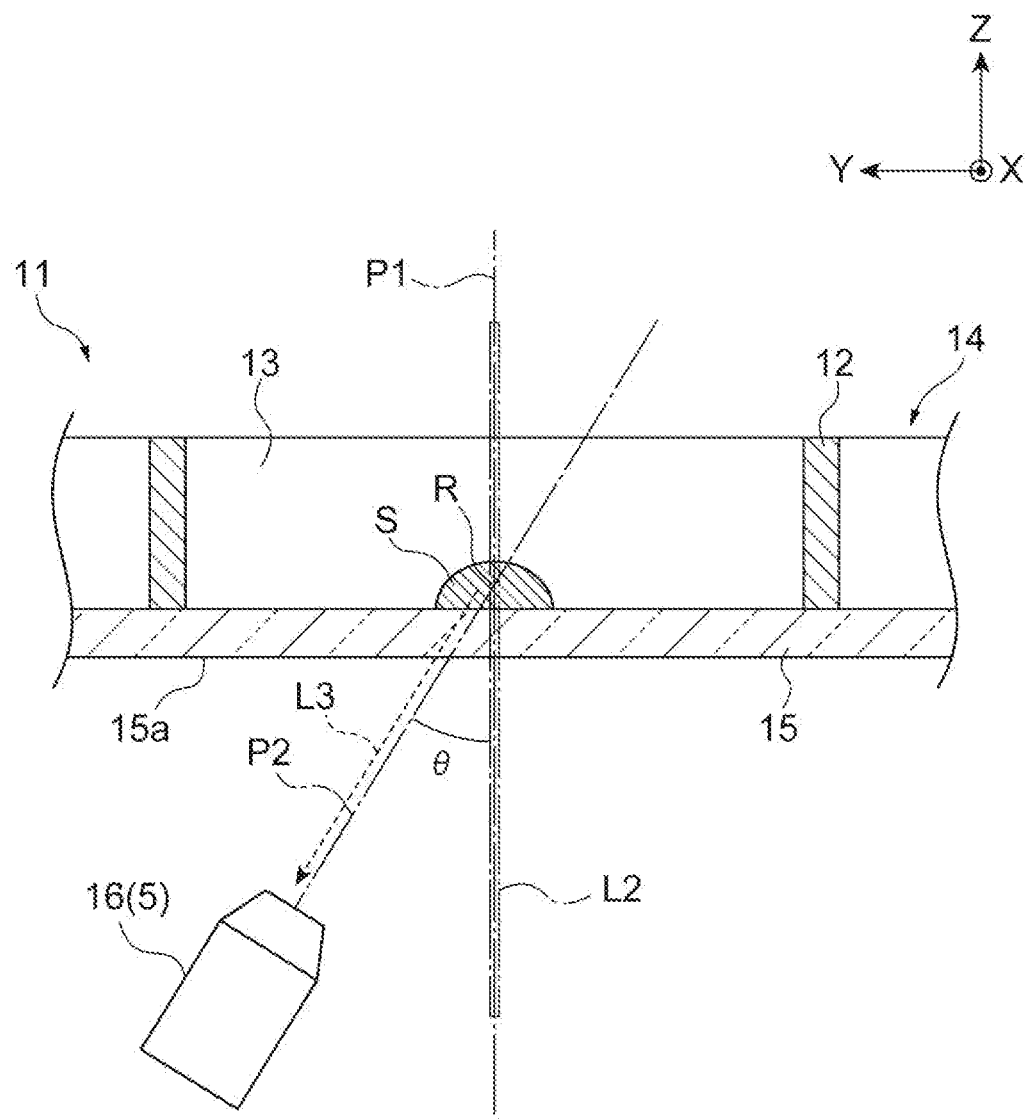
FIG. 2 is a main-part enlarged diagram illustrating the vicinity of a sample.

The scanning unit 4 is a mechanism that scans the sample S with the emission face R of the planar light L2. In this embodiment, the scanning unit 4 is configured of a moving stage 12 that moves a sample container 11 holding the sample S. The sample container 11, for example, is a micro plate, a slide glass, a petri dish, or the like. In this embodiment, the micro plate will be illustrated as an example. The sample container 11, as illustrated in FIG. 2, includes a plate-shaped main body part 14 in which a plurality of wells 13 in which the sample S is disposed are arranged in one straight line pattern (or a matrix pattern) and a plate-shaped transparent member 15 disposed to close one end side of the wells 13 on one face side of the main body part 14.

In arranging a sample S inside a well 13, the inside of the well 13 may be filled with a medium such as water. The transparent member 15 includes an input face 15a of the planar light L2 for the sample arranged inside the well 13. The material of the transparent member 15 is not particularly limited as long as it is a member having transparency for the planar light L2 and, for example, is glass, crystal, or a synthetic resin. The sample container 11 is arranged with respect to the moving stage 12 such that the input face 15a is orthogonal to the optical axis P1 of the planar light L2. In addition, the other end side of the well 13 is open to the outside. The sample container 11 may be fixed to the moving stage 12.

The moving stage 12, as illustrated in FIG. 1, scans the sample container 11 in a direction set in advance in accordance with a control signal supplied from the computer 7. In this embodiment, the moving stage 12 scans the sample container 11 in one direction within a plane orthogonal to the optical axis P1 of the planar light L2. In the following description, the direction of the optical axis P1 of the planar light L2 will be referred to as a Z axis, a scanning direction of the sample container 11 according to the moving stage 12 will be referred to as a Y axis, and a direction orthogonal to the Y axis within the plane orthogonal to the optical axis P1 of the planar light L2 will be referred to as an X axis. The emission face R of the planar light L2 for the sample S is a face within an XY plane.

The imaging optical system 5 is an optical system that images the observation light L3 generated in the sample S in accordance with emission of the planar light L2. The imaging optical system 5, as illustrated in FIG. 2, for example, is configured to include an objective lens 16, an imaging lens, and the like. An optical axis of the imaging optical system 5 becomes an observation axis P2 of the observation light L3. The observation axis P2 of this imaging optical system 5 is inclined with respect to the emission face R of the planar light L2 in the sample S at an inclination angle $\theta$. The inclination angle $\theta$ coincides with an angle formed by the optical axis P1 of the planar light L2 toward the sample S and the observation axis P2. The inclination angle $\theta$ is in the range of 10° to 80°. From a viewpoint of improving the resolution of an observed image, it is preferable that the inclination angle $\theta$ be in the range of 20° to 70°. In addition, from a viewpoint of improving the resolution of an observed image and the stability of a field of view, the inclination angle $\theta$ is more preferably in the range of 30° to 65°.

The image acquiring unit 6, as illustrated in FIG. 1, is a device that acquires a plurality of partial image data corresponding to a part of an optical image according to the observation light L3 formed by the imaging optical system 5. The image acquiring unit 6, for example, is configured to include an imaging device that captures an optical image according to the observation light L3. As the imaging device, for example, there is an area image sensor such as a CMOS image sensor or a CCD image sensor. Such an area image sensor is disposed on an image formation face according to the imaging optical system 5, and, for example, captures an optical image using a global shutter or a rolling shutter, and outputs data of a two-dimensional image to the computer 7.

Figure 3:
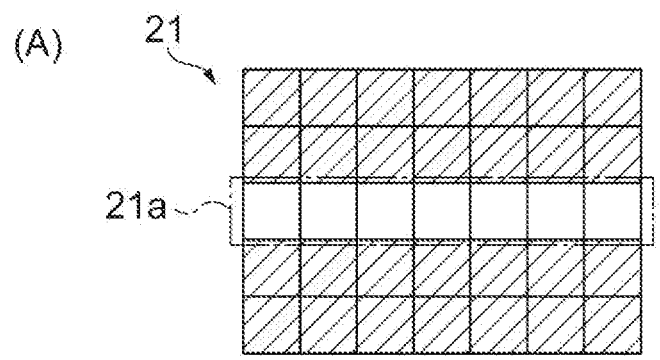
FIG. 3 is a diagram illustrating one example of an image acquiring unit.
Figure 3:
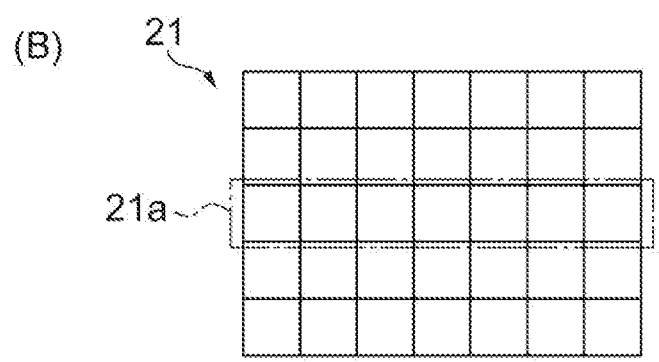
Figure 3:
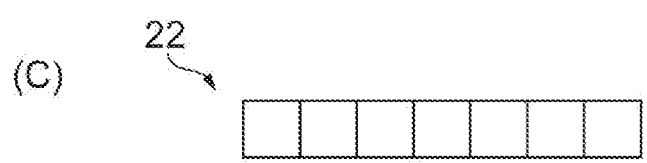
Figure 3:
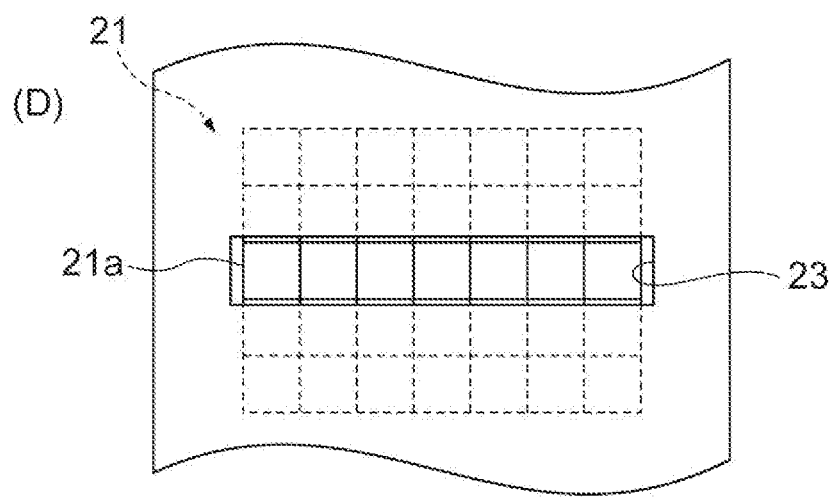

For a method for acquiring partial image data of an optical image according to the observation light L3, various forms may be employed. For example, as illustrated in FIG. 3(A), a sub array may be set on the imaging surface of the area image sensor 21. In reading a sub array in the area image sensor, only a set pixel column can be read among all the pixel columns, and a frame rate can be improved. Accordingly, in this case, only a pixel column 21a included in the sub array can be read, and accordingly, partial image data can be acquired by capturing a part of the optical image according to the observation light L3. In addition, as illustrated in FIG. 3(B), partial image data may be acquired by setting all the pixel columns of the area image sensor 21 as a read area and extracting a part of a two-dimensional image using image processing performed thereafter.

Furthermore, as illustrated in FIG. 3(C), partial image data may be acquired by limiting the imaging surface to one pixel column using a line sensor 22 instead of the area image sensor 21. In addition, as illustrated in FIG. 3(D), by disposing a slit 23 transmitting only a part of the observation light L3 on a front face of the area image sensor (an optical detector) 21, image data of the pixel column 21a corresponding to the slit 23 may be acquired as partial image data. Furthermore, in a case in which the slit 23 is used, instead of the area image sensor 21, a point sensor such as a photomultiplier tube may be used.

The computer 7 is physically configured to include a memory such as a RAM, a ROM, and the like, a processor (an arithmetic operation circuit) such as a CPU, a communication interface, a storage unit such as a hard disk, and a display unit such as a display. As such a computer 7, for example, there is a personal computer, a cloud server, a smart device (a smartphone, a tablet terminal, or the like), a microcomputer, or the like. By executing a program stored in the memory using the CPU of the computer system, the computer 7 functions as a controller controlling operations of the light source 2 and the moving stage 12, an image generating unit 8 generating observation image data of a sample S, and an analysis unit 10 analyzing the observation image data (see FIG. 1).

The computer 7, as a controller, receives an input of a user's measurement start operation and drives the light source 2, the moving stage 12, and the image acquiring unit 6 in synchronization with each other. In this case, during moving of the sample S according to the moving stage 12, the computer 7 may perform control of the light source 2 such that the light source 2 continuously outputs the light L1 or may control on/off of an output of the light L1 using the light source 2 in accordance with imaging executed by the image acquiring unit 6. In addition, in a case in which the emission optical system 3 includes an optical shutter (not illustrated in the drawing), the computer 7 may turn on/off emission of the planar light L2 onto the sample S by controlling the optical shutter.

In addition, the computer 7, as the image generating unit 8, generates observation image data of the sample S based on a plurality of partial image data generated by the image acquiring unit 6. The image generating unit 8 generates observation image data of the sample S on a face (the XY plane) orthogonal to the optical axis P1 of the planar light L2, for example, based on the plurality of partial image data output from the image acquiring unit 6. The image generating unit 8 executes storage of the generated observation image data, display of the observation image data on a monitor or the like, and the like in accordance with a user's predetermined operation.

The computer 7, as the analysis unit 10, generates an analysis result by executing an analysis based on the observation image data generated by the image generating unit 8. The analysis unit 10 executes storage of the generated analysis result, display of the analysis result on a motor or the like, and the like in accordance with a user's predetermined operation. In addition, only the analysis result generated by the analysis unit 10 may be displayed on a monitor or the like without performing display of the observation image data generated by the image generating unit on a monitor or the like.

[Sample Observation Method]

Figure 4:
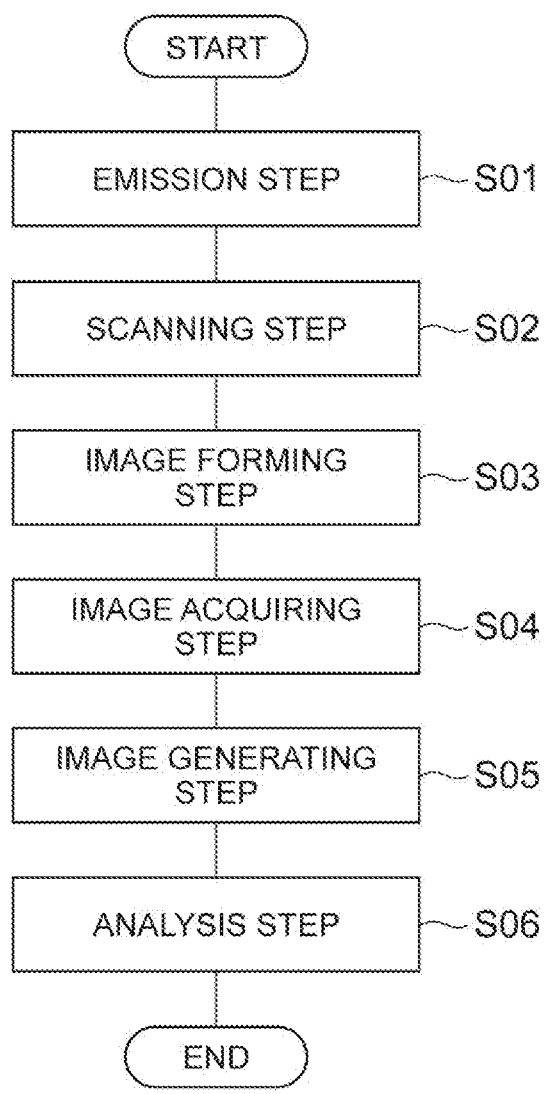
FIG. 4 is a flowchart illustrating one example of a sample observation method using a sample observation device.

FIG. 4 is a flowchart illustrating one example of a sample observation method using a sample observation device. As illustrated in the drawing, this sample observation method includes an emission step (Step S01), a scanning step (Step S02), an image forming step (Step S03), an image acquiring step (Step S04), an image generating step (S05), and an analysis step (Step S06).

In the emission step S01, the planar light L2 is emitted to a sample S. When a measurement start operation is input by a user, the light source is driven based on a control signal supplied from the computer 7, and light L1 is output from the light source 2. The light L1 output from the light source 2 is shaped by the emission optical system 3 to be planar light L2, and the planar light L2 is emitted to the sample S.

In the scanning step S02, the sample S is scanned by the emission face R of the planar light L2. When a measurement start operation is input by a user, the moving stage 12 is driven in synchronization with driving of the light source 2 based on a control signal supplied from the computer 7. Accordingly, the sample container 11 is linearly driven at a constant speed in the Y-axis direction, and the sample S disposed inside the well 13 is scanned by the emission face R of the planar light L2.

In the image forming step S03, by using the imaging optical system 5 having an observation axis P2 inclined with respect to the emission face R, an image of the observation light L3 generated in the sample S according to the emission of the planar light L2 is formed on the image formation face of the image acquiring unit 6. In the image acquiring step S04, a plurality of partial image data corresponding to a part of an optical image according to the observation light L3 that is formed by the imaging optical system 5 are acquired. The partial image data is sequentially output from the image acquiring unit 6 to the image generating unit 8.

Figure 5:
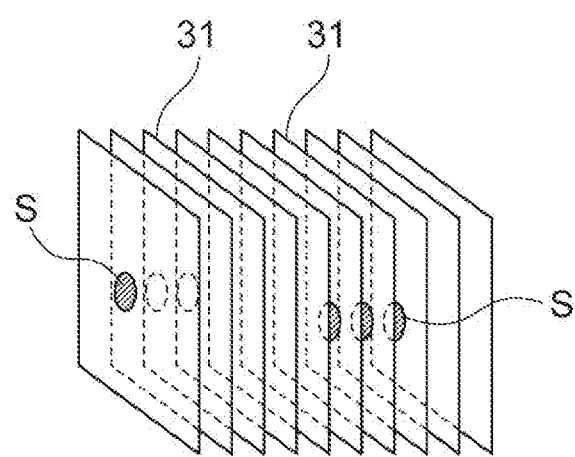
FIG. 5 is a diagram illustrating one example of generation of observation image data using an image generating unit.
Figure 5:
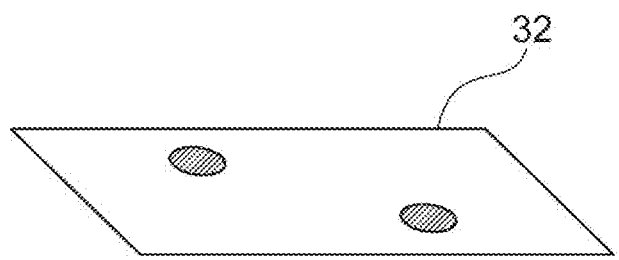

In the image generating step S05, observation image data of the sample S is generated based on the plurality of partial image data. In this embodiment, as illustrated in FIGS. 1 and 2, the emission face R of the planar light L2 for the sample S is a face within an XZ plane, and the sample S is scanned with the emission face R in the Y-axis direction. Accordingly, as illustrated in FIG. 5(A), in accordance with acquisition of a plurality of pieces of XZ cross-sectional image data 31 that is partial image data in the Y-axis direction, three-dimensional information of the sample S is accumulated in the image generating unit 8. In the image generating unit 8, data is rebuilt using a plurality of XY cross-sectional images, and, for example, as illustrated in FIG. 5(B), an XY cross-sectional image having an arbitrary thickness at an arbitrary position of the sample S in the Z axis direction is generated as observation image data 32 in which a background is suppressed.

In the analysis step S06, the observation image data is analyzed by the analysis unit 10, and an analysis result is generated. For example, in drug discovery screening, a sample S and a reagent are put into the sample container 11, and observation image data is acquired. Then, the analysis unit 10 evaluates the reagent based on the observation image data and generates evaluation data as a result of the analysis.

Effects

Figure 6:
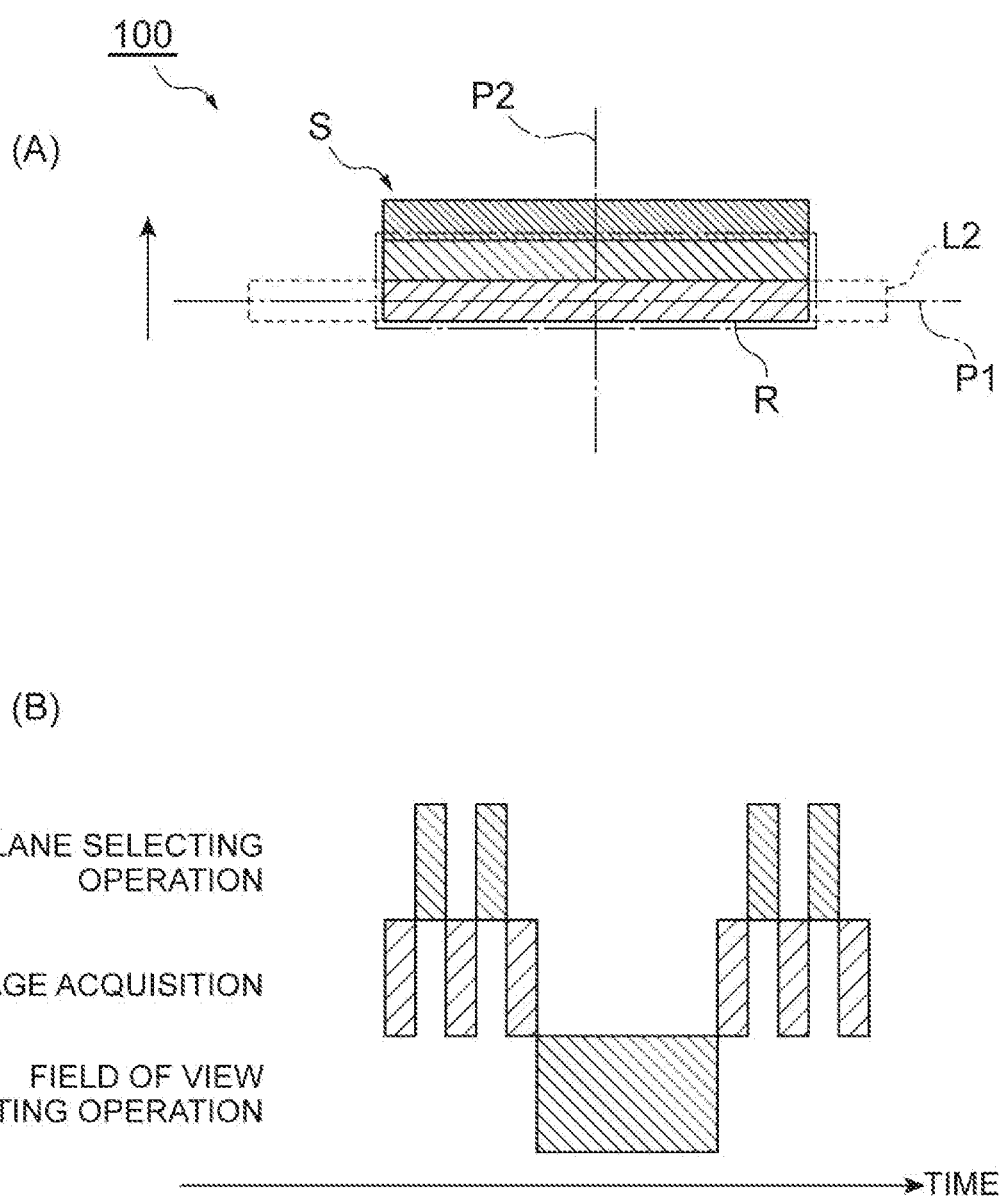
FIG. 6 is a diagram illustrating a view of image acquisition in a comparative example.

A sample observation device 100 according to a comparative example, as illustrated in FIG. 6(A), has an observation axis P2 that is orthogonal to the emission face R of the planar light L2. In this sample observation device 100, by emitting the planar light L2 onto the whole surface of a focused face of the observation optical system, an image of a fault plane orthogonal to the direction of the observation axis P2 in the sample S can be acquired by performing imaging once.

Accordingly, in order to acquire three-dimensional information of the sample S, it is necessary to acquire images of a plurality of fault planes orthogonal to the direction of the observation axis P2 by scanning the sample S in the direction of the observation axis P2. The sample observation device 100 according to the comparative example, as illustrated in FIG. 6(B), needs to repeat selection of a fault plane from which an image is acquired (scanning of the sample S and stopping) and image acquisition until the images of all the fault planes are acquired. In addition, in a case in which an area in which an observation target is present is larger than an imaging area, in addition to the operation of acquiring a cross-sectional image in the direction of the observation axis P2, an operation of selecting an imaging field of view and the like in accordance with movement of a stage in a direction different from the observation axial direction are necessary.

Figure 7:
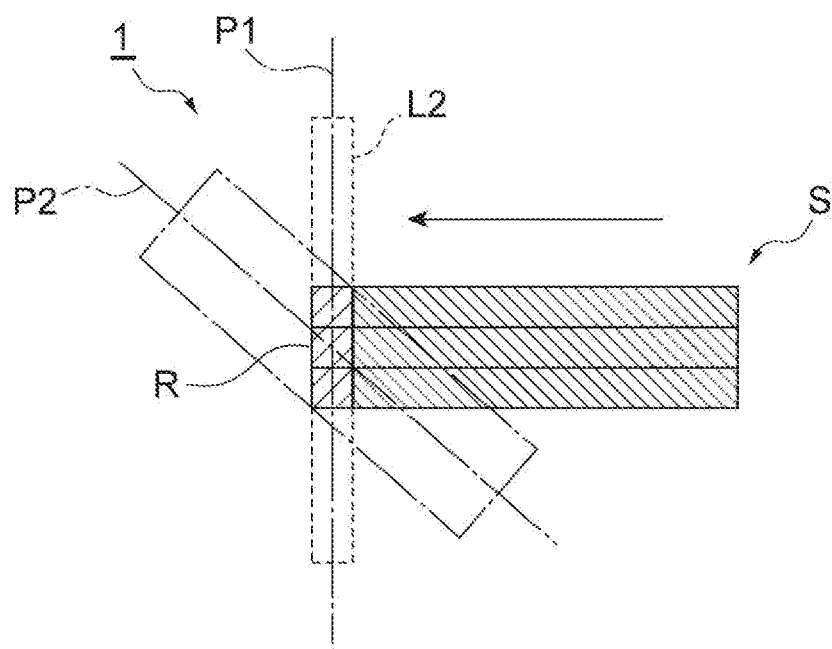
FIG. 7 is a diagram illustrating a view of image acquisition according to an example.
Figure 7:
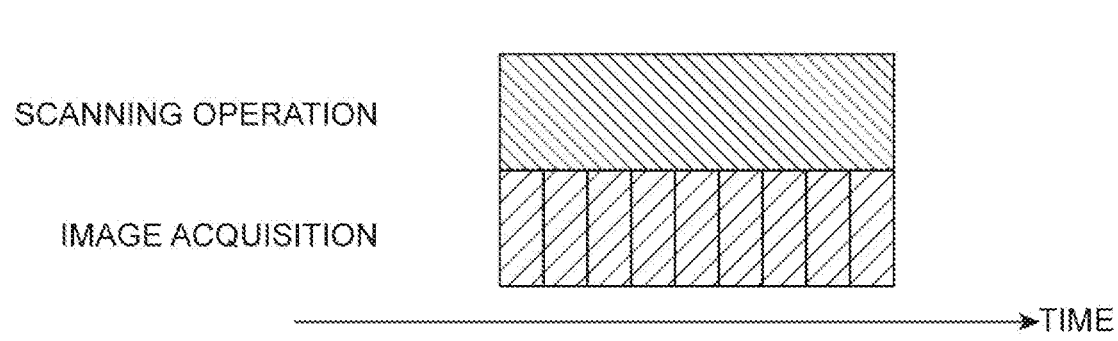

In contrast to this, in the sample observation device 1 according to an example, as illustrated in FIG. 7(A), while a sample S is scanned with the emission face R of the planar light L2, image acquisition is performed by the image acquiring unit 6, and the observation axis P2 of the imaging optical system 5 is inclined with respect to the emission face R of the planar light L2. For this reason, the image acquiring unit 6 can sequentially acquire partial image data of fault planes in the direction of the optical axis P1 (the Z-axis direction) of the planar light L2, and the image generating unit 8 can generate observation image data 32 of the sample S based on a plurality of partial image data.

In this sample observation device 1, as illustrated in FIG. 7(B), image acquisition can be sequentially performed while the sample S is scanned. In the operation of the sample observation device 100 according to the comparative example, every time when the moving stage 12 is driven and stopped, a time loss occurs in accordance with an influence of inertia and the like. On the other hand, in the sample observation device 1, the number of times of driving and stopping of the moving stage 12 is decreased, and a scanning operation for a sample and image acquisition are simultaneously performed, whereby the throughput until the acquisition of the observation image data 32 is improved.

In addition, in the sample observation device 1, as illustrated in FIG. 2, a sample S is held by the sample container 11 having the input face 15a of the planar light L2, and the optical axis P1 of the planar light L2 according to the emission optical system 3 is arranged to be orthogonal to the input face 15a of the sample container 11. In addition, in the sample observation device 1, the scanning unit 4 scans the sample S in a direction (the Y-axis direction) orthogonal to the optical axis P1 (Z-axis direction) of the planar light L2 according to the emission optical system 3. Accordingly, image processing such as a position correction for the partial image data acquired by the image acquiring unit 6 and the like is not necessary, and the process of generating observation image data can be easily performed.

In addition, in the sample observation device 1, the inclination angle θ of the observation axis P2 of the imaging optical system 5 for the emission face R of the planar light L2 in the sample is in the range of 10° to 80°, is preferably in the range of 20° to 70°, and is more preferably in the range of 30° to 65°. Hereinafter, this point will be reviewed.

Figure 8:
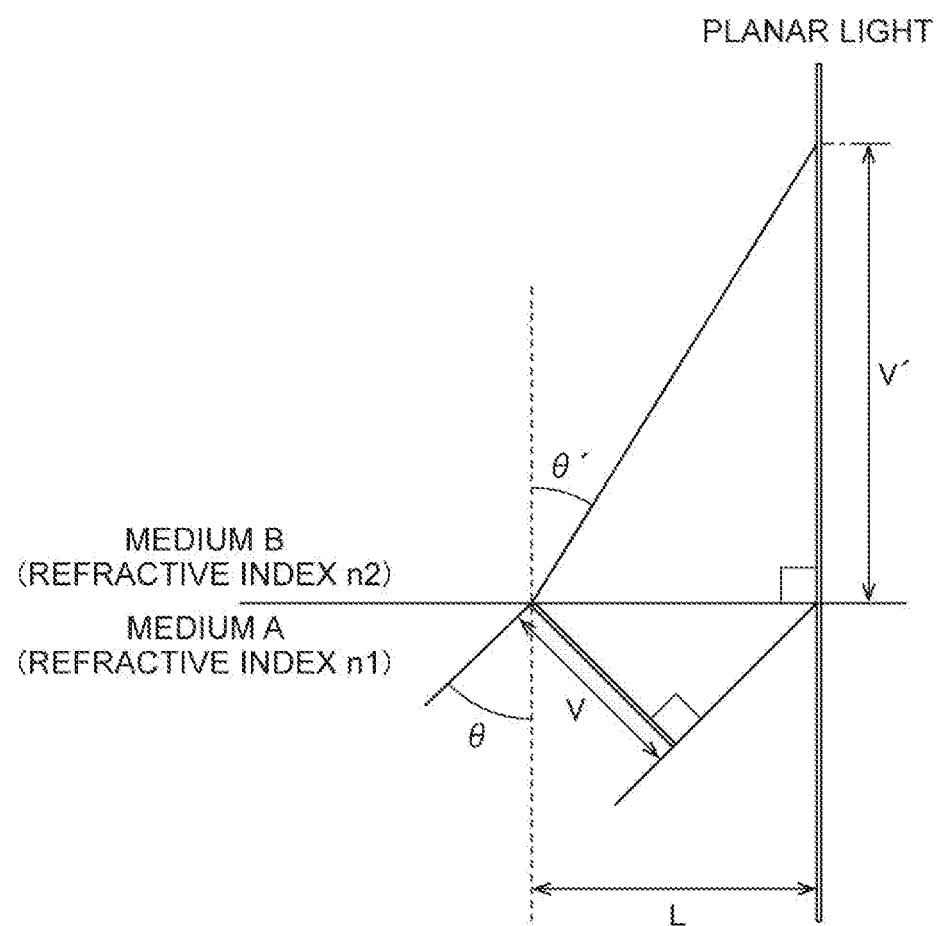
FIG. 8 is a diagram illustrating an example of calculation of a field of view in a sample observation device.

FIG. 8 is a diagram illustrating an example of calculation of a field of view in a sample observation device. In the example illustrated in the drawing, an imaging optical system is positioned in a medium A having a refractive index n1, and an emission face of planar light is positioned in a medium B having a refractive index n2. In a case in which a field of view in the imaging optical system is denoted by V, an emission face is denoted by V', an inclination angle of the observation axis for the emission face is denoted by θ, a refraction angle at an interface between the media A and B is denoted by θ', and a distance on the interface between the media A and B at the inclination angle θ of the field of view V is denoted by L, the following Equations (1) to (3) are satisfied.

(Math 1)

$$L = V/\cos\theta \quad (1)$$

(Math 2)

$$\sin\theta' = (n1/n2)\sin\theta \quad (2)$$

(Math 3)

$$V' = L/\tan\theta' \quad (3)$$

Figure 9:
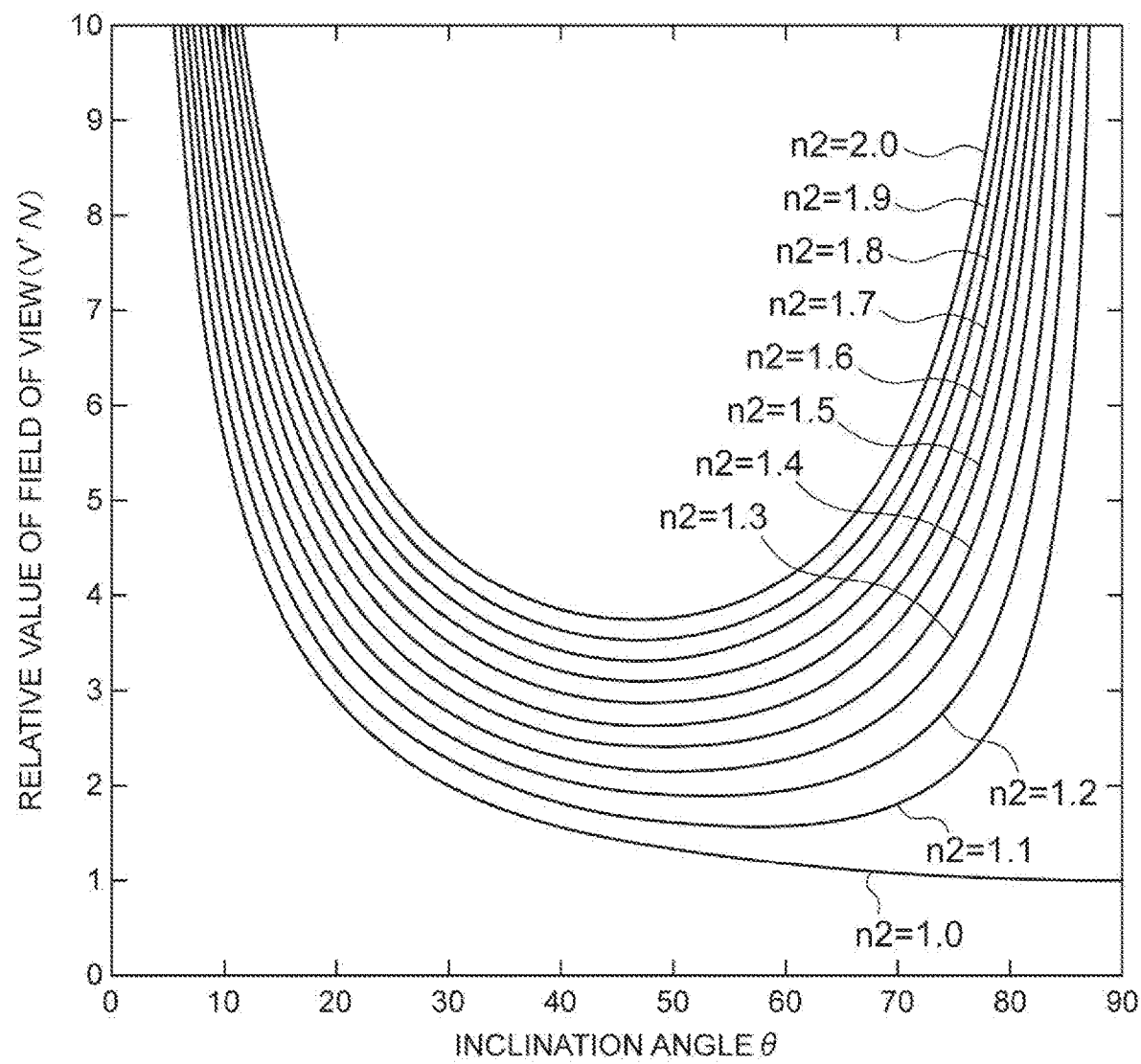
FIG. 9 is a diagram illustrating a relation between an inclination angle of an observation axis and resolution.

FIG. 9 is a diagram illustrating a relation between an inclination angle of an observation axis and resolution. In the drawing, the horizontal axis represents the inclination angle θ of the observation axis, and the vertical axis represents a relative value V'/V of the field of view. Then, a value of V'/V acquired when the refractive index n1 of the medium A is set to "1" (air), and the refractive index n2 of the medium B is changed from 1.0 to 2.0 at the interval of 0.1 is plotted with respect to the inclination angle θ. It is represented that the resolution in the depth direction (hereinafter, referred to as "Z-direction resolution") of the sample is higher as the value of V'/V becomes smaller, and the Z-direction resolution is lower as the value becomes larger.

From the result illustrated in FIG. 9, in a case in which the refractive index n1 of the medium A and the refractive index n2 of the medium are the same, it can be understood that the value of V'/V is inversely proportional to the inclination angle θ. In addition, in a case in which the refractive index n1 of the medium A and the refractive index n2 of the medium B are different from each other, it can be understood the value of V'/V forms a parabola with respect to the inclination angle θ. From this result, it can be understood that the Z-direction resolution can be controlled using the refractive index of a space in which the sample is arranged, a refractive index of a space in which the imaging optical system is arranged, and the inclination angle θ of the observation axis. In addition, it can be understood that higher Z-direction resolution is acquired in the range of 10° to 80° of the inclination angle θ than in a range in which the inclination angle θ is less than 10° or more than 80°.

In addition, from the result illustrated in FIG. 9, it can be understood that the inclination angle θ at which the Z-direction resolution is a maximum tends to be lower as a difference between the refractive index n1 and the refractive index n2 becomes larger. In a case in which the refractive index n2 is in the range of 1.1 to 2.0, the inclination angle θ at which the Z-direction resolution is a maximum is in the range of about 47° to about 57°. For example, in a case in which the refractive index n2 is 1.33 (water), the inclination angle θ at which the Z-direction resolution is a maximum is estimated to be about 52°. In addition, for example, in a case in which the refractive index n2 is 1.53 (glass), the inclination angle θ at which the Z-direction resolution is a maximum is estimated to be about 48°.

Figure 10:
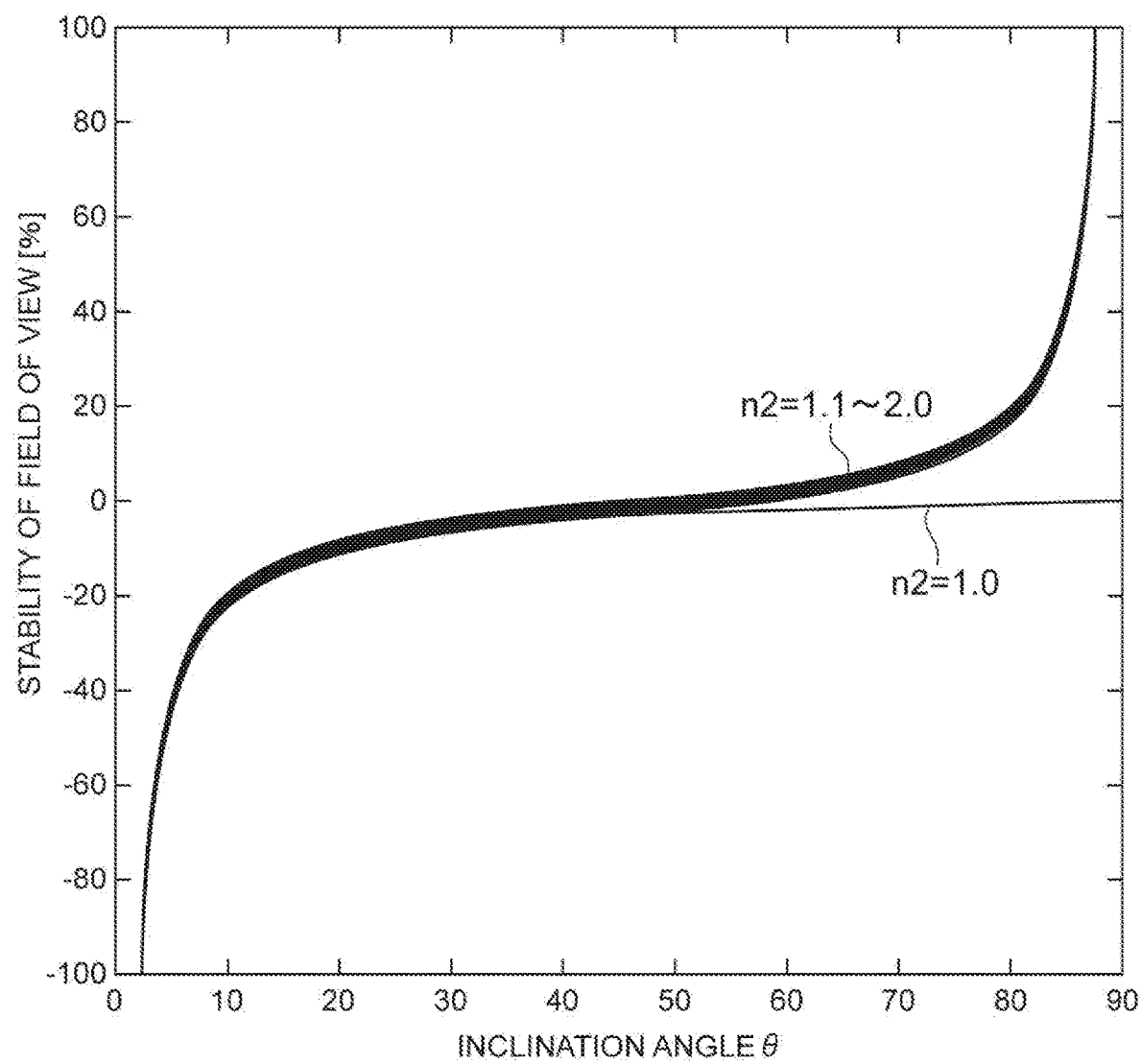
FIG. 10 is a diagram illustrating a relation between an inclination angle of an observation axis and stability of a field of view.

FIG. 10 is a diagram illustrating a relation between the inclination angle of the observation axis and stability of the field of view. In the drawing, the horizontal axis represents the inclination angle θ of the observation axis, and the vertical axis represents the stability of the field of view. The stability is represented as a ratio between a difference between V'/V at an inclination angle θ+1 and V'/V at an inclination angle θ and a difference between V'/V at an inclination angle θ−1 and V'/V at the inclination angle θ and is calculated based on the following Equation (4). As the stability is closer to 0%, it can be evaluated that a change in the field of view with respect to a change in the inclination angle is small, and the view of field is stabilized. In this FIG. 10, similar to FIG. 9, the stability acquired when the refractive index n1 of the medium A is set to "1" (air), and the refractive index n2 of the medium B is changed from 1.0 to 2.0 at the interval of 0.1 is plotted.

(Math 4)

$$\text{Stability (\%)} = ((V'/V)_{\theta+1} - (V'/V)_{\theta-1})/(V'/V)_\theta \qquad (4)$$

From the result illustrated in FIG. 10, it can be understood that, in a range in which the inclination angle θ is less than 10° or more than 80°, the stability exceeds ±20%, and it is difficult to control the view of field. On the other hand, in a case in which the angle θ is in the range of 10° to 80°, the stability is equal to or less than ±20%, and the field of view can be controlled. In addition, in a case in which the inclination angle θ is in the range of 20° to 70°, the stability is equal to or less than ±10%, and the field of view can be easily controlled.

Figure 11:
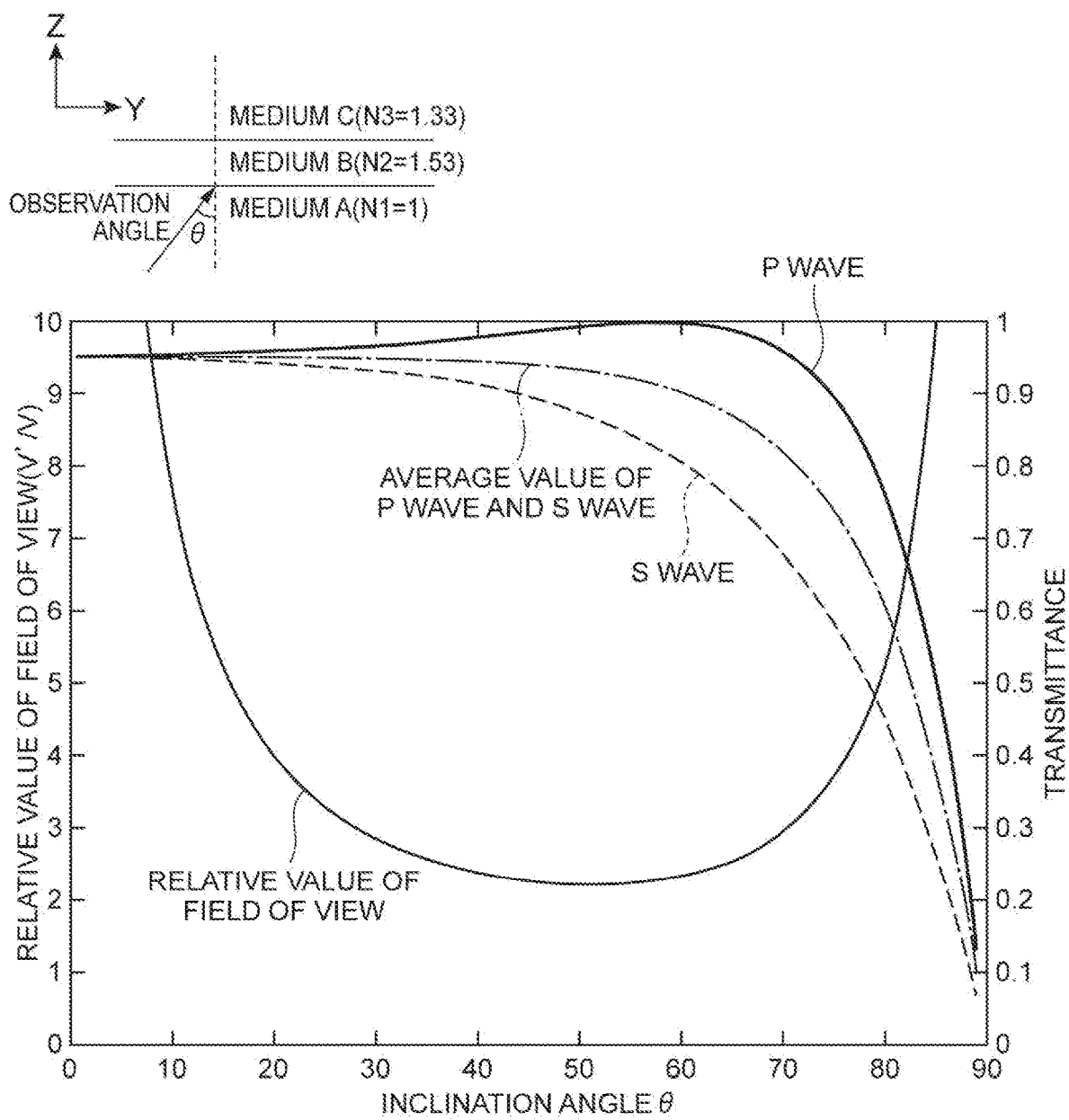
FIG. 11 is a diagram illustrating a relation between an inclination angle of an observation axis and transmittance of observation light transmitted from a sample.

FIG. 11 is a diagram illustrating a relation between the inclination angle of the observation axis and transmittance of observation light transmitted from a sample. In the drawing, the horizontal axis represents the inclination angle θ of the observation axis, a left vertical axis represents a relative value of the field of view, and a right vertical axis represents transmittance. In this FIG. 11, in consideration of the maintaining state of a sample in the sample container, the refractive index n1 of the medium A is set to 1 (air), the refractive index n2 of the medium B is set to 1.53 (glass), and the refractive index n3 of the medium C is set to 1.33 (water), and a value of transmittance is product of transmittance of an interface between the media B and C and transmittance of an interface between the media A and B. In FIG. 11, the transmittance of P waves, the transmittance of S waves, and the dependency of an average value thereof on the angle are plotted. In addition, in FIG. 11, a relative value of the field of view in the medium C is plotted together.

From the result illustrated in FIG. 11, it can be understood that the transmittance of observation light from a sample to the imaging optical system is changeable by changing the inclination angle θ of the observation axis. It can be understood that at least 50% or higher transmittance is acquired in a range in which the inclination angle θ is equal to or less than 80°. In addition, it can be understood that at least 60% or higher transmittance is acquired in a range in which the inclination angle θ is equal to or less than 70°, and at least 75% or higher transmittance is acquired in a range in which the inclination angle θ is equal to or less than 65°.

From the results described above, in a case in which the Z-direction resolution of a sample is requested, for example, it is appropriate to select the inclination angle θ from the range of 30° to 65° such that the value of V'/V, which is a relative value of the field of view, is equal to or less than 3, the stability is less than 5%, and the transmittance (an average value of P waves and S waves) of the observation light is equal to or higher than 75%. On the other hand, in a case in which the Z-direction resolution of a sample is not requested, the inclination angle θ may be appropriately selected from a range of 10° to 80°, and, from a viewpoint of securing a range of the field of view per pixel, it is appropriate to select the inclination angle θ from a range of 10° to 30° or 65° to 80°.

The sample observation device and the sample observation method are not limited to those according to the embodiment described above. For example, the optical axis P1 of the planar light L2 and the input face 15a of the sample container 11 may not necessarily be orthogonal to each other, and the optical axis P1 of the planar light L2 and the scanning direction of the sample S scanned by the scanning unit 4 may not necessarily be orthogonal to each other.

In addition, for example, in the embodiment described above, although the transparent member 15 is disposed to occupy the one end side of the well 13 in the sample container 11, and the planar light L2 is input from the input face 15a of the transparent member 15, the planar light L2 may be configured to be input from the other end side of the well 13. In such a case, the number of interfaces between media having different refractive indexes is decreased, and the number of times of refraction of the observation light L3 can be decreased. In addition, instead of the sample container 11, a sample S may be maintained in a solid such as gel, and, like a flow cytometer, a sample S may move by causing a fluid body such as a sheath liquid to flow inside the transparent container. In the case of the flow cytometer, a sheath liquid in which a liquid containing a test body that is a sample S is included flows in accordance with a flow cell. Accordingly, the test body moves while being arranged, and accordingly, the flow cell can be positioned as a scanning unit.

In addition, a plurality of imaging optical system 5 and a plurality of image acquiring units 6 may be disposed. In such a case, in addition to enlargement of the observation range, a plurality of pieces of observation light L3 having different wavelengths can be observed. In addition, a plurality of image acquiring units 6 may be disposed for one imaging optical system 5, and one image acquiring unit 6 may be disposed for a plurality of imaging optical systems 5. A plurality of image acquiring units 6 may combine optical detectors or imaging devices of different types. The light source 2 may be configured by a plurality of light sources outputting light having different wavelengths. In such a case, excitation light having different wavelengths can be emitted to a sample S.

Figure 12:
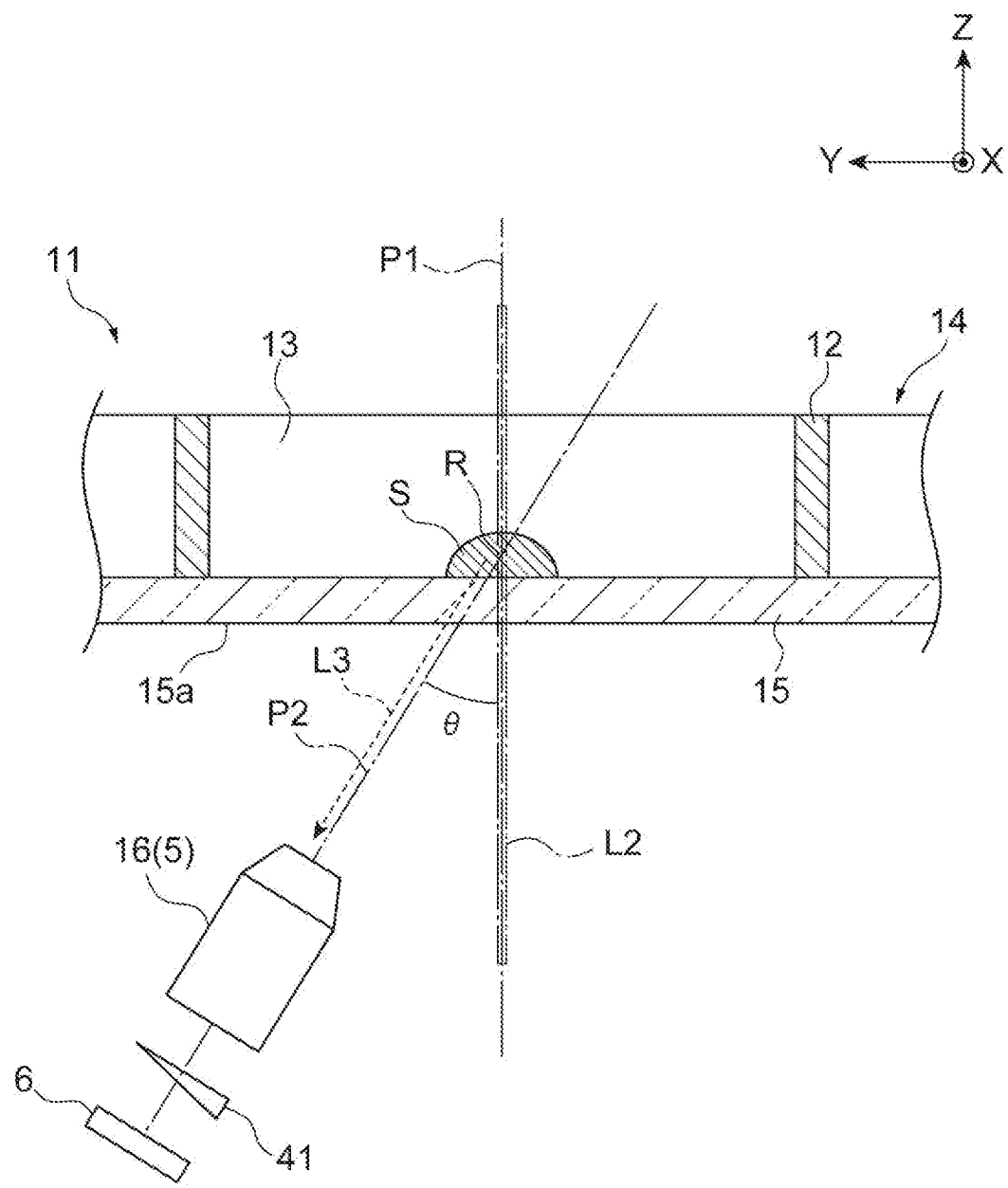
FIG. 12 is a diagram illustrating a modified example of an imaging optical system.

In addition, in order to alleviate astigmatism, a prism may be disposed in the imaging optical system 5. In such a case, for example, as illustrated in FIG. 12, the prism 41 may be disposed on a later stage side of the objective lens 16 (between the objective lens 16 and the image acquiring unit 6). For a countermeasure for defocusing, the imaging surface of the imaging device in the image acquiring unit 6 may be inclined with respect to the observation axis P2. Furthermore, a configuration may be employed in which separation of wavelengths of the observation light L3 may be performed by disposing a dichroic mirror or a prism, for example, between the imaging optical system 5 and the image acquiring unit 6.

In addition, as described above, as the observation light L3, fluorescent light excited by the planar light L2, scattered light of the planar light L2, diffuse reflected light of the planar light L2, or the like may be considered. For this reason, the image acquiring unit 6 may acquire image data of the observation light L3 of different types. In such a case, at least two types of observation light among fluorescent light excited by the planar light L2, scattered light of the planar light L2, and diffuse reflected light of the planar light L2 may be set as targets.

REFERENCE SIGNS LIST

1 Sample observation device
3 Emission optical system
4 Scanning unit
5 Imaging optical system
6 Image acquiring unit
8 Image generating unit
10 Analysis unit
11 Sample container 15a Input face
21 Area image sensor (imaging device)
22 Line sensor
23 Slit
31 Partial image data
32 Observation image data
L2 Planar light
L3 Observation light
P2 Observation axis
R Emission face
S Sample
θ Inclination angle

The invention claimed is:

1. A system comprising:
an emission optical system configured to emit planar light having an emission face in an XZ plane onto a sample;
a scanner configured to scan the sample with respect to an emission face of the planar light at a constant speed;
an imaging optical system having an observation axis inclined with respect to the emission face and configured to form an image from observation light generated in the sample in accordance with the emission of the planar light;
an image acquiring unit configured to acquire a plurality of image data on the XZ plane corresponding to an optical image according to the observation light formed as an image by the imaging optical system, while scanning the sample by the scanner; and
a computer configured to generate observation image data of the sample on the XY plane, based on the plurality of partial image data generated by the image acquiring unit.

2. The system according to claim 1, wherein the sample is held by a sample container having an input face of the planar light, and an optical axis of the planar light according to the emission optical system is disposed to be orthogonal to the input face of the sample container.

3. The system according to claim 1, wherein the scanner is configured to scan the sample in a direction orthogonal to the optical axis of the planar light according to the emission optical system.

4. The system according to claim 1, wherein an inclination angle of the observation axis of the imaging optical system with respect to the emission face of the planar light is in the range of 10° to 80°.

5. The system according to claim 1, wherein an inclination angle of the observation axis of the imaging optical system with respect to the emission face of the planar light is in the range of 20° to 70°.

6. The system according to claim 1, wherein an inclination angle of the observation axis of the imaging optical system with respect to the emission face of the planar light is in the range of 30° to 65°.

7. The system according to claim 1, wherein the image acquiring unit includes a two-dimensional image sensor and is configured to extract image data corresponding to a part of the optical image of the observation light from data output from the two-dimensional image sensor as the image data.

8. The system according to claim 1, wherein the image acquiring unit includes a line sensor configured to capture a part of the optical image according to the observation light and outputting the image data.

9. The system according to claim 1, wherein the image acquiring unit includes a slit transmitting a part of an optical image according to the observation light and an optical detector configured to detect an optical image transmitted through the slit and is configured to generate the image data based on data output from the optical detector.

10. The system according to claim 1, further comprising an analyzer configured to analyze the observation image data to generate an analysis result.

11. A method comprising:
emitting planar light having an emission face in an XZ plane onto a sample;
scanning the sample with respect to an emission face of the planar light at a constant speed;
forming an image from observation light generated in the sample in accordance with the emission of the planar light using an imaging optical system having an observation axis inclined with respect to the emission face;
acquiring, while scanning the sample, a plurality of image data on the XZ plane corresponding to an optical image according to the observation light formed as an image by the imaging optical system; and
generating observation image data of the sample on the XZ plane based on the plurality of the image data.

12. The method according to claim 10, wherein the sample is held by a sample container having an input face of the planar light, and an optical axis of the planar light is disposed to be orthogonal to the input face of the sample container.

13. The method according to claim 10, wherein the scanning scans the sample in a direction orthogonal to the optical axis of the planar light.

14. The method according to claim 10, wherein an inclination angle of the observation axis of the imaging optical system with respect to the emission face of the planar light is in the range of 10° to 80°.

15. The method e according to claim 10, wherein an inclination angle of the observation axis with respect to the emission face of the planar light is in the range of 20° to 70°.

16. The method according to claim 10, wherein an inclination angle of the observation axis with respect to the emission face of the planar light is in the range of 30° to 65°.

17. The method according to claim 10, further comprising:
analyzing the observation image data to generate an analysis result.

* * * * *